US006776676B2

(12) United States Patent
Tanaka et al.

(10) Patent No.: US 6,776,676 B2
(45) Date of Patent: Aug. 17, 2004

(54) PERSONAL WATERCRAFT

(75) Inventors: Yoshinobu Tanaka, Hyogo (JP); Toshio Araki, Hyogo (JP); Atsufumi Ozaki, Hyogo (JP); Yoshimoto Matsuda, Hyogo (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 10/226,989

(22) Filed: Aug. 23, 2002

(65) Prior Publication Data

US 2004/0038602 A1 Feb. 26, 2004

(51) Int. Cl.[7] ................................................ B60K 41/00
(52) U.S. Cl. ............................................ 440/87; 440/1
(58) Field of Search ............................... 440/1, 84, 87; 701/21

(56) References Cited

U.S. PATENT DOCUMENTS 4,966,247 A * 10/1990 Masuda ...................... 180/171
5,041,040 A * 8/1991 Jones et al. ................... 441/69
5,074,810 A * 12/1991 Hobbs et al. .................. 440/2
5,142,473 A * 8/1992 Davis .......................... 701/21
5,171,171 A * 12/1992 Tani ............................. 440/1
5,494,464 A * 2/1996 Kobayashi et al. ........... 440/41
5,700,171 A * 12/1997 Horton ........................ 440/87
5,941,188 A * 8/1999 Takashima ................. 114/55.5
6,021,734 A * 2/2000 Sperberg .................... 114/363
6,109,986 A * 8/2000 Gaynor et al. ................ 440/87
6,159,059 A 12/2000 Bernier et al.
6,280,269 B1 * 8/2001 Gaynor ........................ 440/84
6,318,490 B1 * 11/2001 Laning ....................... 180/170
6,349,700 B1 * 2/2002 Buckland et al. ........... 123/352
6,375,525 B1 * 4/2002 Kanno ......................... 440/87
6,431,930 B1 * 8/2002 Holt ............................ 440/84
6,485,341 B1 * 11/2002 Lanyi et al. .................. 440/87
6,517,396 B1 * 2/2003 Into ............................ 440/84
2003/0013354 A1 * 1/2003 Yanagihara .................... 440/1

FOREIGN PATENT DOCUMENTS

JP 10-029595 2/1998

* cited by examiner

*Primary Examiner*—Andrew Wright
(74) *Attorney, Agent, or Firm*—Marshall, Gerstein & Borun LLP

(57) ABSTRACT

Disclosed is a jet-propulsion personal watercraft adapted to eject water pressurized and accelerated by a water jet pump from an outlet port so as to be propelled as the resulting reaction, the personal watercraft being provided with a cruising control switch to allow an electric control unit to control a throttle actuator in accordance with an operation of the cruising control switch so that the watercraft cruises at a predetermined cruising speed or engine speed.

3 Claims, 14 Drawing Sheets

PERSONAL WATERCRAFT

BACKGROUND OF THE INVENTION

1. Field of the Invention

The present invention relates to a jet-propulsion personal watercraft (PWC) which ejects water rearward and planes on a water surface as the resulting reaction. More particularly, the present invention relates to a personal watercraft having a cruising control function.

2. Description of the Related Art

In recent years, so-called jet-propulsion personal watercrafts have been widely used in leisure, sports, rescue activities, and the like. The personal watercraft is configured to have a water jet pump that pressurizes and accelerates water sucked from a water intake generally provided on a hull bottom surface and ejects it rearward from an outlet port. Thereby, the personal watercraft is propelled.

Many of the personal watercrafts are small straddle-type watercraft capable of carrying one to three riders. Since such watercraft have high driving (turning) performance, a throttle operation is commonly performed by a throttle lever provided in the vicinity of a grip of a bar-type handle.

Since such personal watercrafts are jet-propelled, they are capable of cruising even in shallow waters. Therefore, bases for the personal watercraft (facilities equipped with launching slopes) are commonly located in inland areas distant from general boat cruising areas. While cruising in the shallow waters or at a certain distance from the base, the personal watercraft needs to be cruising at low speeds. In some countries, the water areas requiring low-speed cruising are specified by regulations (e.g., in US, about 5 mile/h equal to about 8 km/h).

During cruising in the shallow waters at low speeds, it is required that the rider continue to operate the throttle lever with high maneuverability at an engine speed slightly higher than an idling speed, which increases rider's operating discomfort. The rider sometimes needs to keep squeezing the throttle lever for a long time. This is also required in the case where the personal watercraft is cruising for a long time at medium or high speeds, for example, the personal watercraft is utilized as a transport means in a water tour.

As a related prior art, Japanese Laid-Open Patent Application Publication No. 10-29595 discloses a device for performing control so that hump state in a medium speed area where non-planing state switches to planing state can smoothly switch to the planing state. In general, when the engine speed is increased/decreased for the purpose of maintaining a constant cruising speed in the hump state, resistance of the body of the watercraft relatively greatly increases/decreases. In particular, when the watercraft is temporarily planing and the resistance of the body greatly decreases, the engine speed becomes too high, i.e., rapid increase in the engine speed occurs.

SUMMARY OF THE INVENTION

The present invention addresses the above-described condition, and an object of the present invention is to provide a personal watercraft having a cruising control function capable of cruising at a constant cruising speed or engine speed without a need for a rider to continue to perform a throttle operation, i.e., an operation which opens/closes the throttle.

Another object of the present invention is to prevent rapid increase in an engine speed.

These objects are achieved by the jet-propulsion personal watercraft constituted as described below.

A jet-propulsion personal watercraft according to the present invention comprises: a water-jet pump including an outlet port and a steering nozzle, the water jet pump pressurizing and accelerating sucked water and ejecting the water from the outlet port to propel the watercraft as a reaction of the rejecting water; and a cruising control operation means, and the watercraft is controlled to cruise at a predetermined cruising speed or a predetermined engine speed in accordance with an operation of the cruising control operation means.

In the jet-propulsion personal watercraft so constituted, the rider merely operates the cruising control operation means, thereby maintaining the predetermined cruising speed or engine speed without a need for the rider to perform the throttle operation. This increases rider's steering comfort in the case where the watercraft is cruising at low speeds for a long time or at medium speeds for a long time in a water tour or the like.

It is preferable that, in the personal watercraft, the cruising control operation means is attached to a handle of the watercraft.

This makes it possible that the rider easily operates the cruising control operation means in a normal steering posture.

It is preferable that, in the personal watercraft, the predetermined cruising speed is set to a low speed of approximately 8 km/h or less. This is advantageous when the watercraft is cruising at low speeds for a long time.

It is preferable that, in the personal watercraft, the predetermined cruising speed or engine speed is set to a cruising speed or engine speed at a point of time when the cruising control operation means is operated. This facilitates cruising at a constant cruising speed or engine speed desired by the rider.

It is preferable that, in the personal watercraft, a plurality of predetermined cruising speeds or engine speeds are preset and the cruising control operation means is adapted to select one of the plurality of cruising speeds or engine speeds. This makes it possible that the watercraft is cruising at a desired cruising speed or engine speed during the water tour, etc.

It is preferable that, in the personal watercraft, the cruising control operation means is comprised of a switch. This is advantageous because the switch is easily operated by the rider and water-proof.

It is preferable that, in the personal watercraft, the switch is placed in the vicinity of a grip of the handle, because the switch is easily operated by the rider.

It is preferable that, the personal watercraft may further comprise: a cruising control OFF operation means, and control, i.e., cruising control for cruising the watercraft at the predetermined cruising speed or engine speed is released in accordance with an operation of the cruising control OFF operation means. The operation of the cruising control can be easily performed.

The personal watercraft may further comprise: a fuel supply unit for supplying fuel to an engine for driving the water jet pump; a throttle operation means for opening/closing a throttle of the fuel supply unit for regulating supply amount of the fuel; an actuator for opening/closing the throttle of the fuel supply unit; and a control means for controlling the actuator so that the watercraft cruises at the predetermined cruising speed or the predetermined engine speed, in accordance with an operation of the cruising control operation means, wherein the fuel supply unit is adapted to allow an opening of the throttle to be increased when one of the throttle operation means and the actuator drives the throttle to be opened, and the opening to be reduced when both of the throttle operation means and the actuator drive the throttle to be closed. With such constitution, the throttle operation means allows the throttle of the fuel supply unit to be opened/closed. Besides, when the cruising control operation means is operated, the control means controls the actuator to cause the throttle of the fuel supply unit to be opened/closed so that the watercraft cruises at the predetermined cruising speed or engine speed. Consequently, the cruising control can be executed in a suitable manner. The fuel supply unit may be a carburetor having a throttle for regulating supply amount of fuel to the engine, and the carburetor may be adapted to allow an opening of the throttle to be increased when one of the throttle operation means and the actuator drives the throttle to be opened, and the opening to be reduced when both of the throttle operation means and the actuator drive the throttle to be closed.

It is preferable that the actuator is mounted to a body of the personal watercraft. The actuator is hardly affected by the oscillation of the engine.

It is preferable that, the carburetor comprises a throttle valve fixed to a rotational shaft and rotating with the rotational shaft to cause an air flow passage of the carburetor to be opened/closed, a connecting member provided at one end of the rotational shaft so as to rotate with the rotational shaft, a rotary engagement member being rotatable coaxially with the rotational shaft, and a throttle pulley provided at the other end of the rotational shaft so as to rotate with the rotational shaft, the rotary engagement member can be brought into contact with an engagement portion of the connecting member by rotating relatively to the engagement portion in a rotational direction of the rotational shaft to cause throttle valve to be opened, the throttle pulley is rotated by the throttle operation means, and the rotary engagement member is rotated by the actuator. With such constitution, the throttle operation means allows the throttle of the carburetor to be opened/closed. Besides, when the cruising control operation means is operated, the control means controls the actuator to cause the throttle of the carburetor to be opened/closed so that the watercraft cruises at the predetermined cruising speed or engine speed. Consequently, the cruising control can be executed in a suitable manner. In addition, since the throttle operation means and the actuator are respectively connected to different end portions of the rotational shaft of the throttle valve, the carburetor can be installed without great spatial limitation.

The above and further objects and features of the invention will be more fully apparent from the following detailed description with accompanying drawings.

DETAILED DESCRIPTION OF THE PREFERRED EMBODIMENTS

Hereinafter, a personal watercraft according to a preferred embodiment of the present invention will be described with reference to the drawings.

Figure 1:
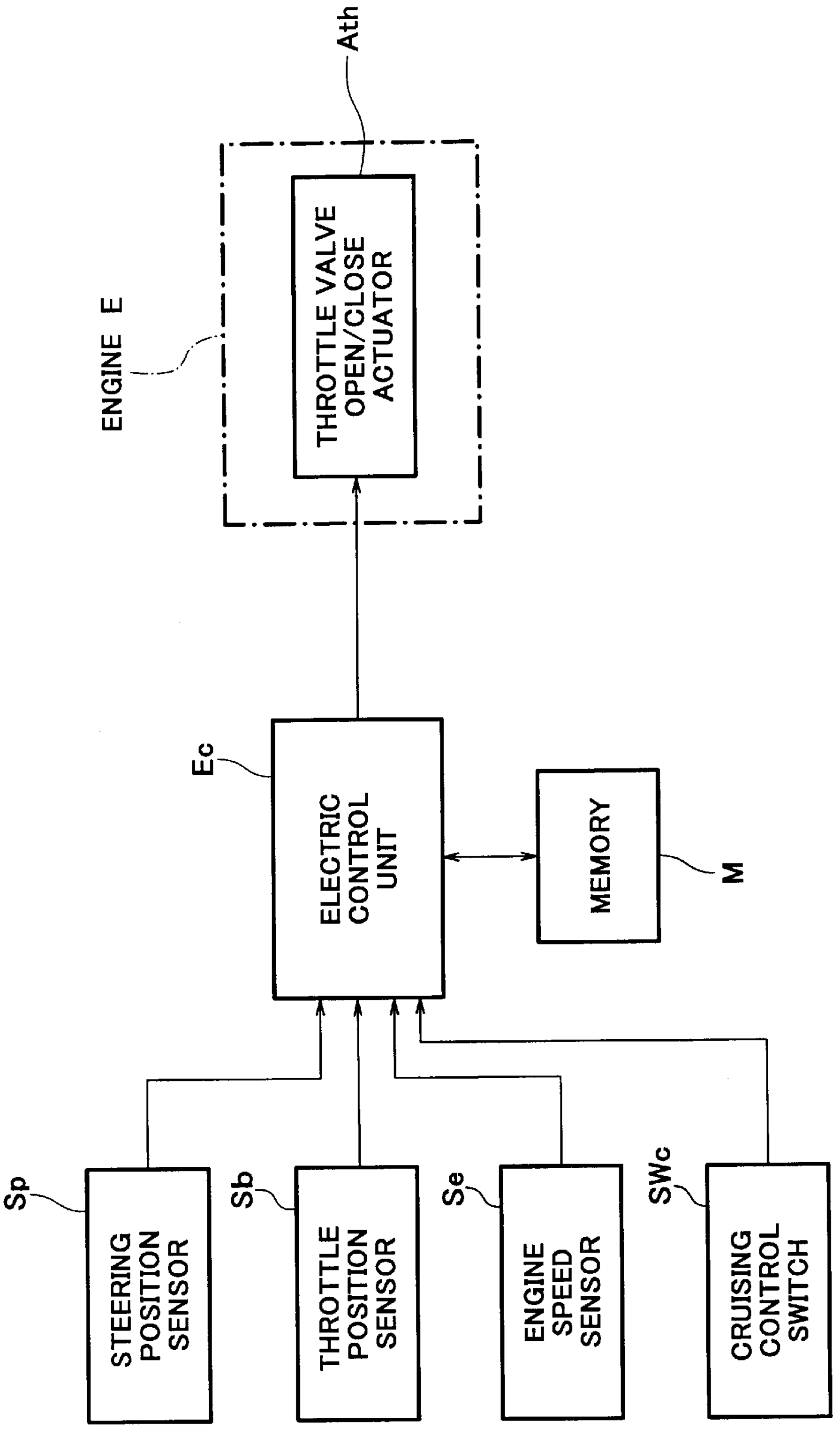
FIG. 1 is a block diagram showing a configuration of a control system of a personal watercraft according to an embodiment of the present invention.
Figure 2:
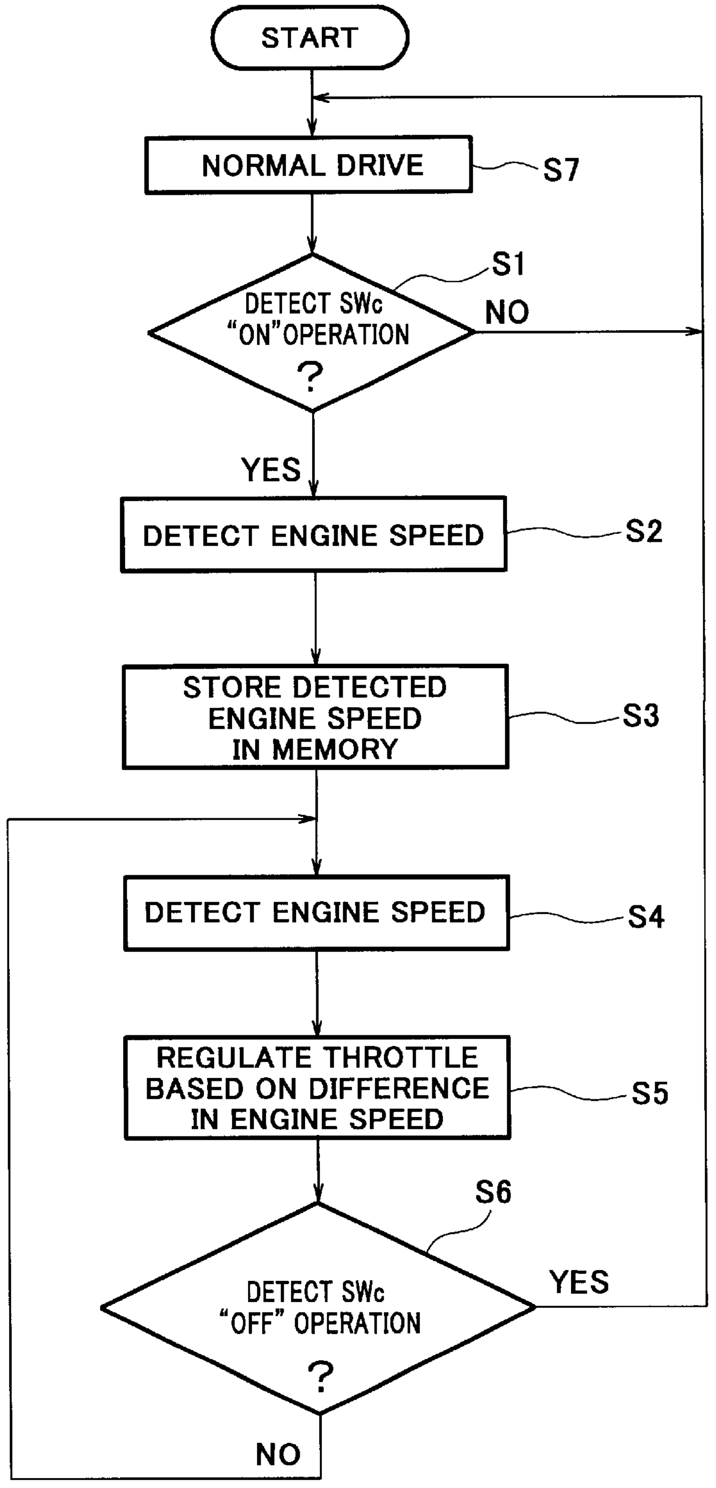
FIG. 2 is a flowchart showing a control process of the configuration in FIG. 1.
Figure 3:
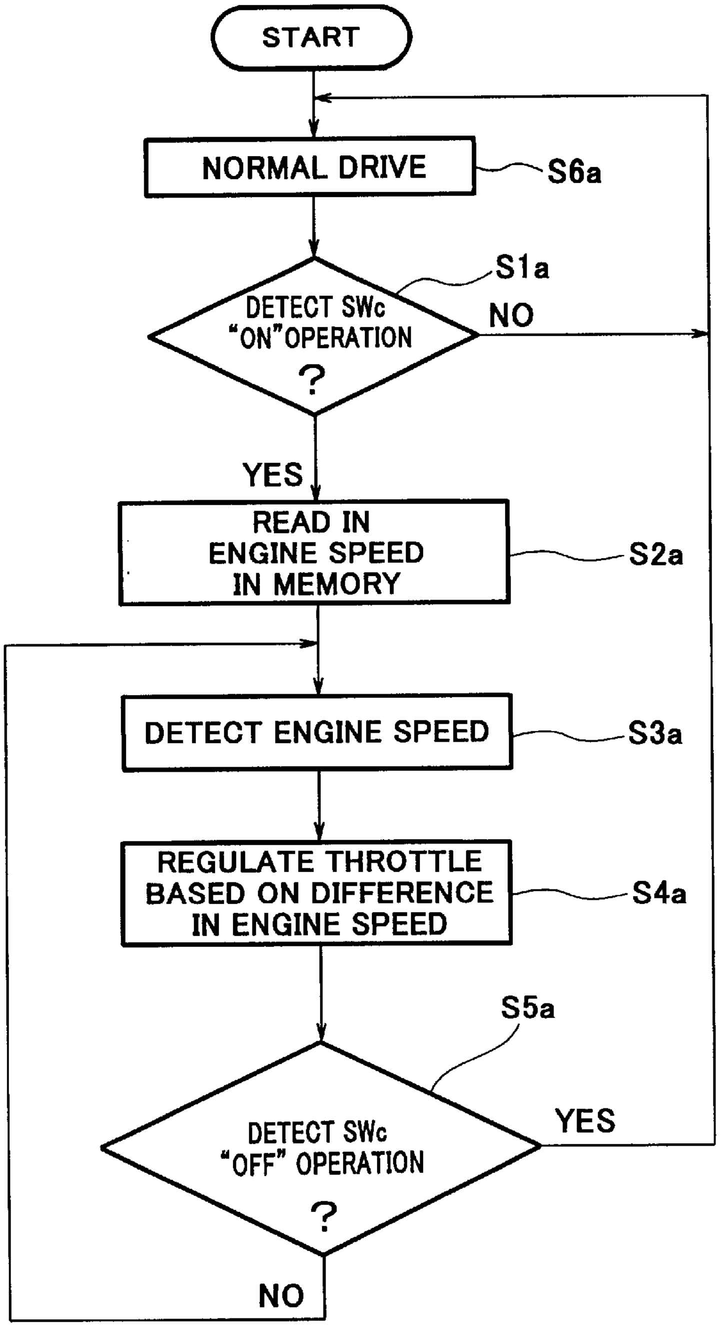
FIG. 3 is a flowchart showing another control process of the configuration in FIG. 1.
Figure 4:
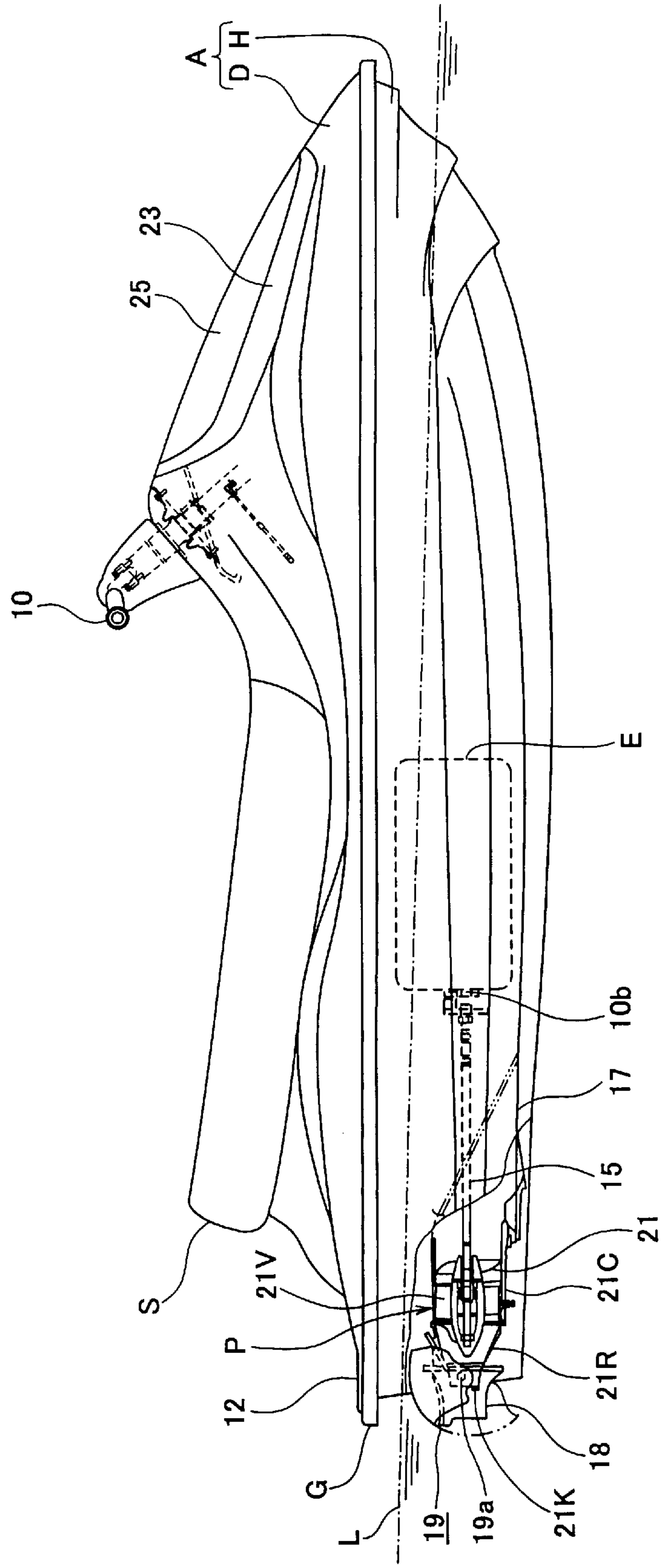
FIG. 4 is a side view showing the personal watercraft according to the embodiment of the present invention.
Figure 5:
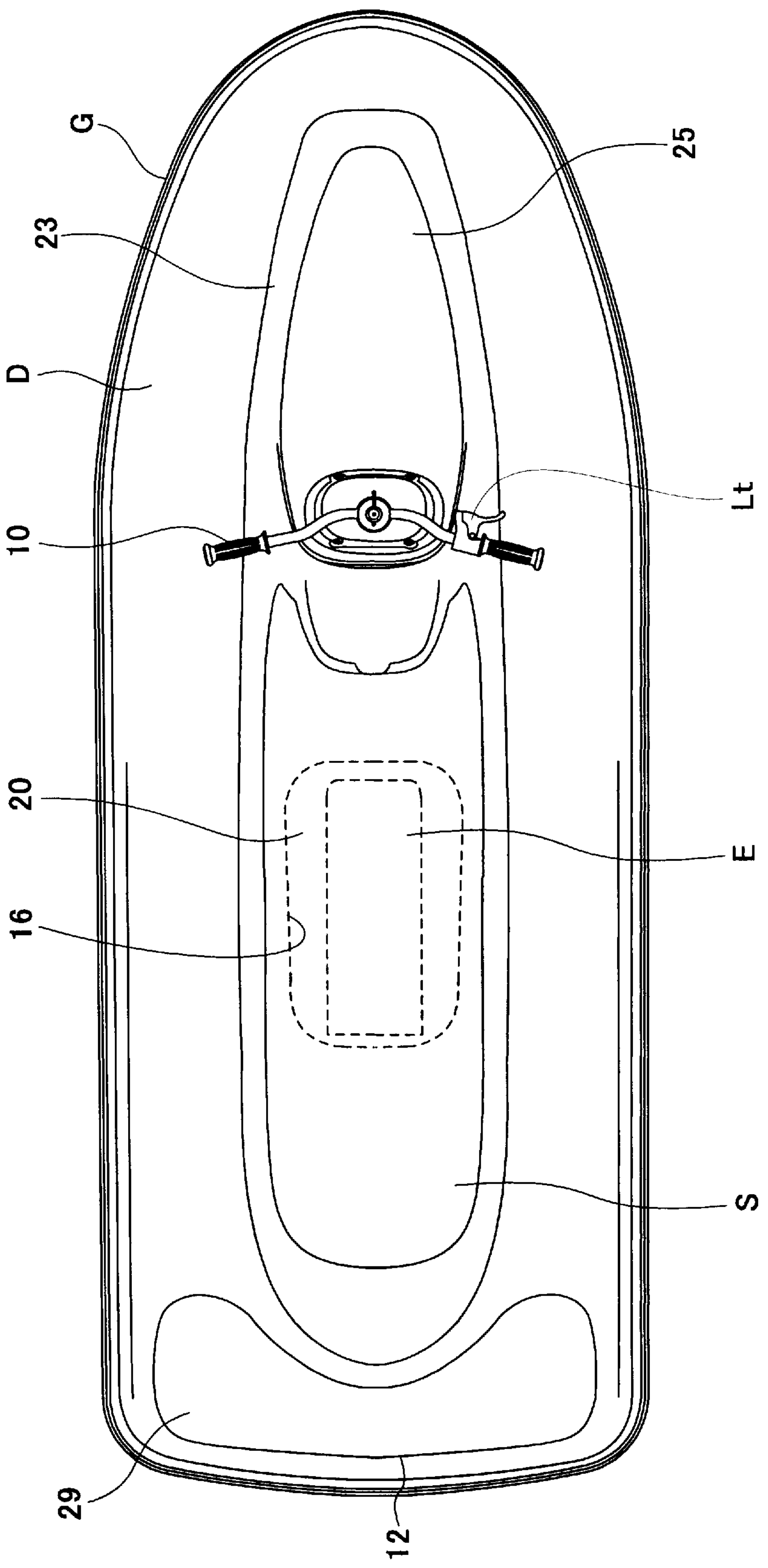
FIG. 5 is a plan view showing the personal watercraft in FIG. 4.
Figure 6:
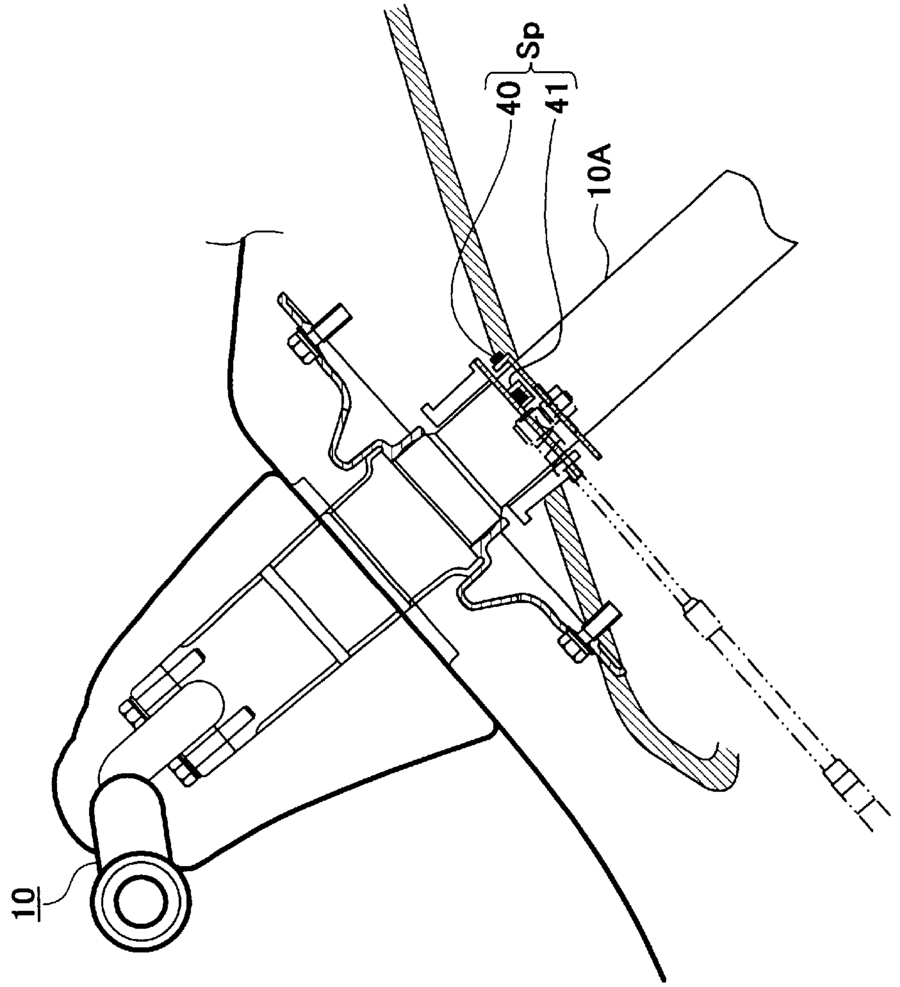
FIG. 6 is an enlarged cross-sectional view of a vicinity of a steering handle in FIG. 4, showing placement and constitution of a steering position sensor.
Figure 7:
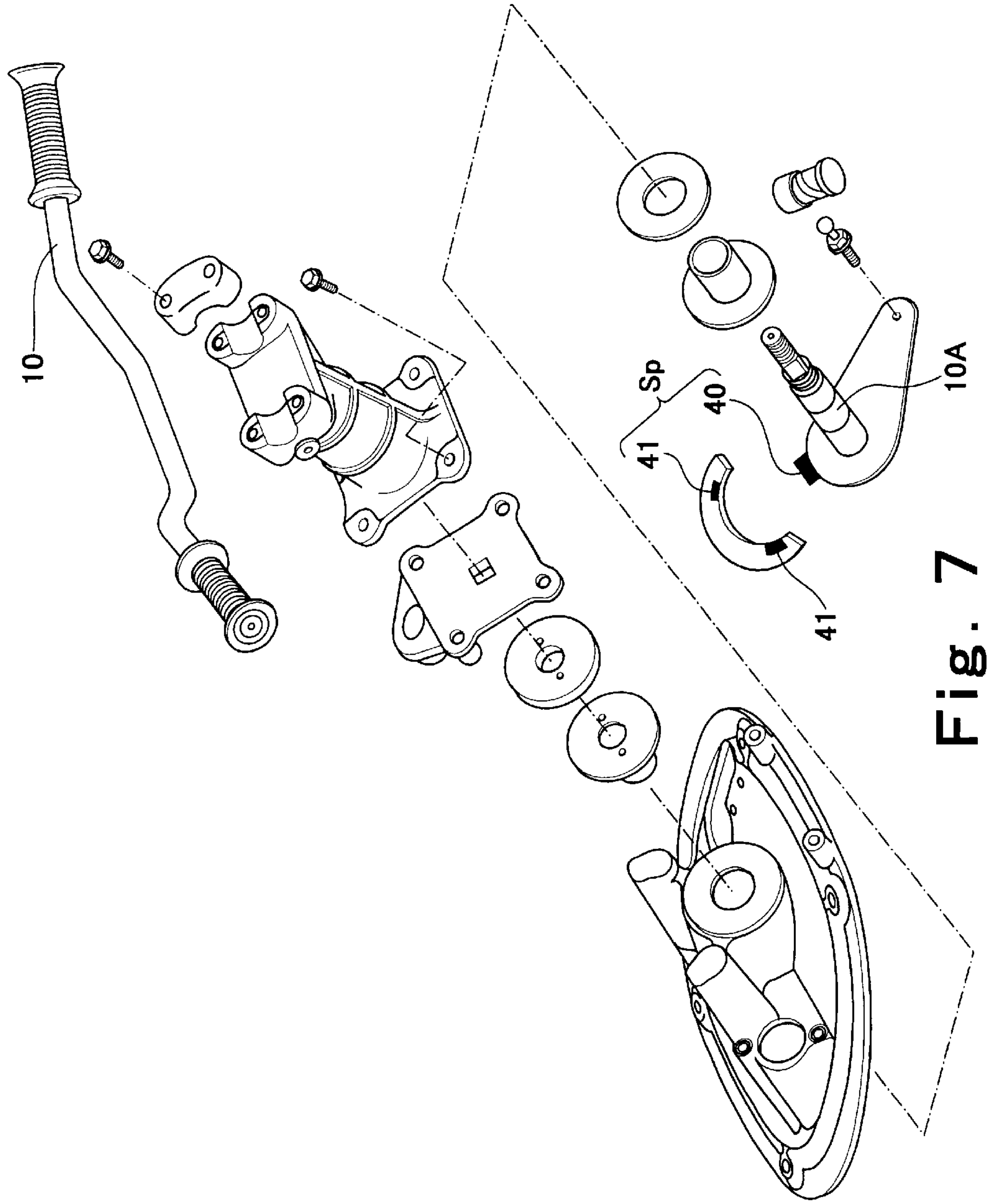
FIG. 7 is an exploded perspective view, showing the steering position sensor in FIG. 6 and constitution of its vicinity.
Figure 8:
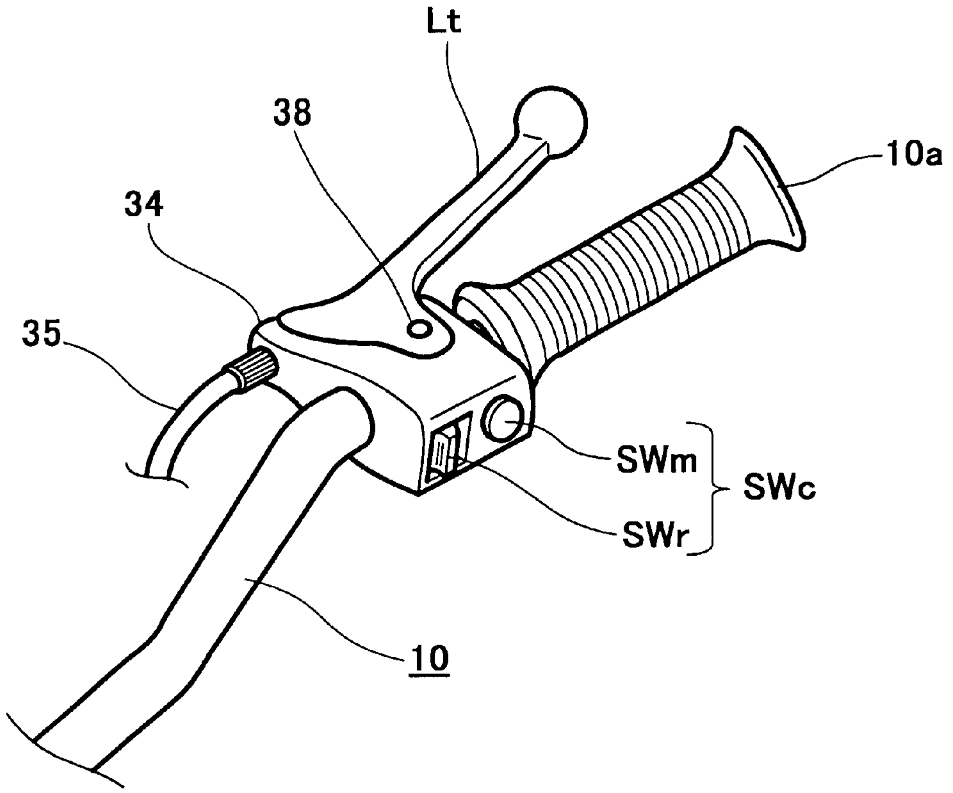
FIG. 8 is an enlarged perspective view of main parts in the vicinity of a throttle lever in FIG. 5.
Figure 9:
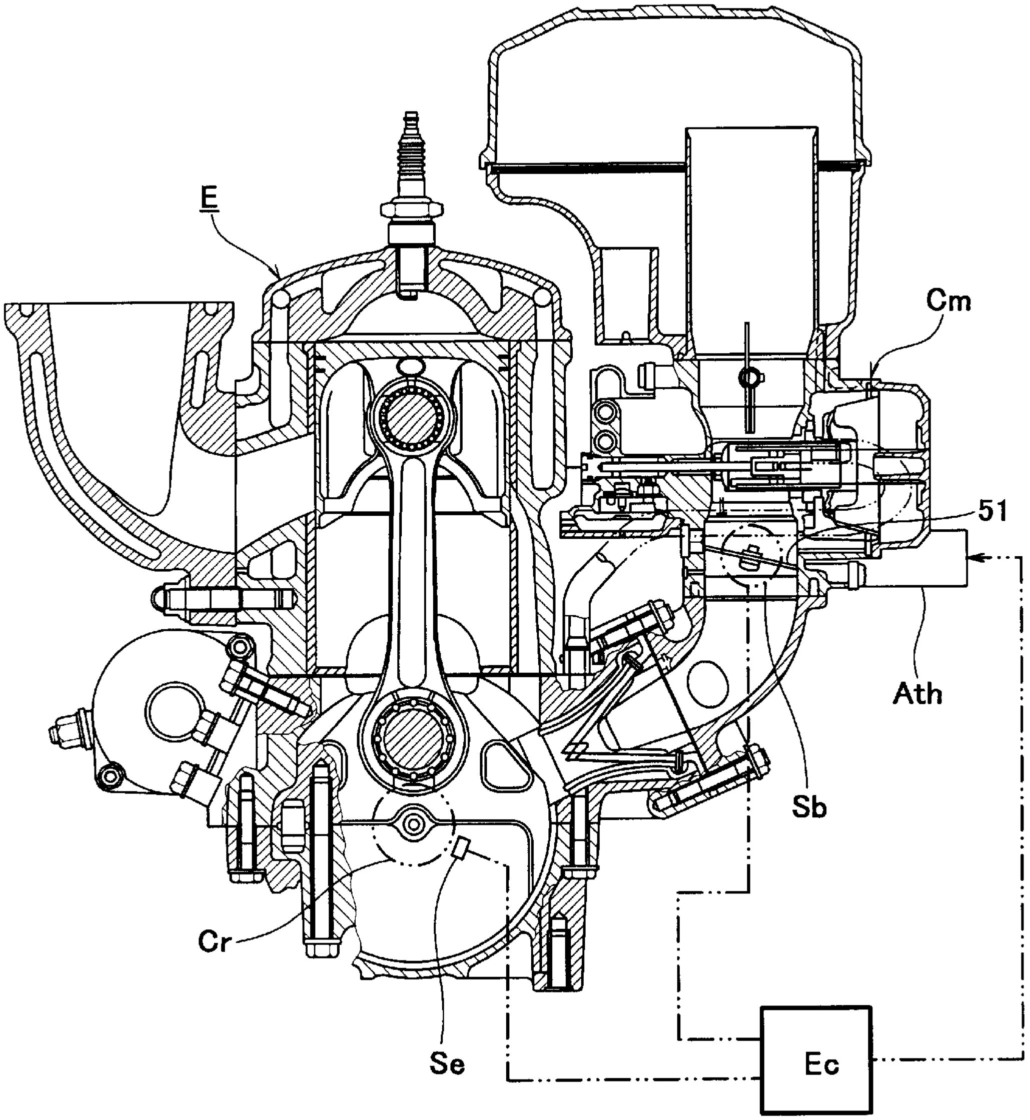
FIG. 9 is a view showing the configuration in FIG. 1, based on the relationship with an engine of the watercraft.

FIG. 1 is a block diagram showing a configuration of a control system of a personal watercraft according to an embodiment of the present invention. FIG. 2 is a flowchart showing a control process of the configuration in FIG. 1. FIG. 3 is a flowchart showing another control process of the components in FIG. 1. FIG. 4 is a side view showing the personal watercraft according to the embodiment of the present invention. FIG. 5 is a plan view showing the personal watercraft in FIG. 4. FIG. 6 is an enlarged cross-sectional view of a vicinity of a steering handle in FIG. 4, showing placement and constitution of a steering position sensor. FIG. 7 is an exploded perspective view, showing the steering position sensor in FIG. 5 and constitution of its vicinity. FIG. 8 is an enlarged perspective view of main parts in the vicinity of a throttle lever in FIG. 5. FIG. 9 is a view showing the configuration in FIG. 1, based on the relationship with an engine of the watercraft.

Referring to FIGS. 4, 5, reference numeral A denotes a body of the personal watercraft. The body A comprises a hull H and a deck D covering the hull H from above. A line at which the hull H and the deck D are connected over the entire perimeter thereof is called a gunnel line G. In this embodiment, the gunnel line G is located above a waterline L of the personal watercraft.

As shown in FIG. 5, an opening 16, which has a substantially rectangular shape seen from above, is formed at a relatively rear section of the deck D such that it extends in the longitudinal direction of the body A, and a riding seat S is provided above the opening 16 such that it covers the opening 16 as shown in FIGS. 4, 5.

An engine E is provided in a chamber (engine room) 20 surrounded by the hull H and the deck D below the seat S.

The engine E has multiple cylinders (e.g., three cylinders). As shown in FIG. 4, a crankshaft **10*b* of the engine E is mounted along the longitudinal direction of the body A. An output end of the crankshaft 10*b* is rotatably coupled integrally with a pump shaft of a water jet pump P through a propeller shaft 15. An impeller 21 is attached on the pump shaft of the water jet pump P. The impeller 21 is covered with a pump casing 21C on the outer periphery thereof. A water intake 17 is provided on the bottom of the hull H. The water is sucked from the water intake 17 and fed to the water jet pump P through a water intake passage 14. The water jet pump P pressurizes and accelerates the water by rotation of the impeller 21. The pressurized and accelerated water is discharged through a pump nozzle 21R having a cross-sectional area of flow gradually reduced rearward, and from an outlet port 21K provided on the rear end of the pump nozzle 21R, thereby obtaining a propulsion force. In FIG. 4, reference numeral 21V denotes fairing vanes for fairing water flow behind the impeller 21**.

As shown in FIGS. 4, 5, reference numeral 10 denotes a bar-type steering handle. The handle 10 operates in association with a steering nozzle 18 swingable around a swing shaft (not shown) to the right or to the left behind the pump nozzle 21R. When the rider rotates the handle 10 clockwise or counterclockwise, the steering nozzle 18 is swung toward the opposite direction so that the watercraft can be correspondingly turned to any desired direction while the water jet pump P is generating the propulsion force.

As shown in FIG. 4, a bowl-shaped reverse deflector 19 is provided above the rear side of the steering nozzle 18 such that it can swing downward around a horizontally mounted swinging shaft 19*a*.

The deflector 19 is swung downward to a lower position behind the steering nozzle 18 to deflect the ejected water from the steering nozzle 18 forward, and as the resulting reaction, the personal watercraft moves rearward.

In FIGS. 4, 5, reference numeral 12 denotes a rear deck. The rear deck 12 is provided with an openable rear hatch cover 29. A rear compartment (not shown) with a small capacity is provided under the rear hatch cover 29. In FIGS. 4, 5, reference numeral 23 denotes a front hatch cover. A front compartment (not shown) is provided under the front hatch cover 23 for storing equipments and the like. Another hatch cover 25 is provided over the front hatch cover 23, thereby forming a two-layer hatch cover. Life jackets or the like can be stored under the upper hatch cover 25 through an opening (not shown) provided in the rear end thereof.

Embodiment 1

In the personal watercraft of the first embodiment, as shown in FIGS. 6, 7, a steering position sensor Sp constituted by a permanent magnet 40 and proximity switches 41 provided on a rotational side and a fixed side in the vicinity of a rotational shaft 10A of the steering handle 10, respectively. In this embodiment, the permanent magnet 40 is attached to a portion of a circular-plate member fixed to a rotational shaft 10A of the steering handle 10. When the permanent magnet 40 comes close to one of the switches 41, the corresponding switch 41 is turned ON.

In this embodiment, as show in FIG. 7, the proximity switches 41, 41 are respectively provided at positions apart from the permanent magnet 40 such that the switches 41 have predetermined angles clockwise and counterclockwise with respect to the permanent magnet 40, at a neutral position of the handle.

As shown in FIG. 5, a throttle lever Lt is provided on one side of the bar-type handle, for operating the engine. As shown in FIG. 8, a lever holder 34 is fixed in the vicinity of a base end of a grip 10*a* provided on one side (right-side in FIG. 8) of the handle 10, for holding the throttle lever Lt to be pivotable around a pivot shaft 38 in front of the grip 10*a*. An attaching hole (not shown) is formed at a position of the holder 34 in front of the handle 10 for allowing an outer cable cover (outer wire portion) of a push-pull wire 35 to be attached thereto. One end of an inner wire of the wire 35 is attached to the throttle lever Lt through the attaching hole, while the other end of the wire 35 is mechanically connected to a throttle valve 51 of the engine E. When the rider operates to pivot the throttle lever Lt, the inner wire of the wire 35 is pushed into/pulled out of the outer cable cover to cause the throttle valve 51 to be opened/closed.

As shown in FIG. 8, a cruising control switch SWc is provided at the rear portion (rider's side) of the lever holder 34. The cruising control switch SWc is, in this embodiment, comprised of a button-type main switch SWm for turning ON/OFF a cruising control mode and a one-way resume switch SWr for reproducing a temporarily stored cruising control state. The cruising control switch SWc is, as shown in FIG. 1, connected to an electric control unit Ec by means of a signal line (electric wire).

As shown in FIG. 9, a throttle position sensor Sb is placed closer to the throttle valve 51 provided in a fuel supply device Cm of the engine E. Further, as shown in FIG. 9, an engine speed sensor Se is provided in the vicinity of a crankshaft Cr.

As shown in FIG. 1, the steering position sensor Sp, the throttle position sensor Sb, and the engine speed sensor Se are respectively connected to the electric control unit Ec by means of signal lines (electric wires). The signals detected by these sensors are sent to the electric control unit Ec.

As shown in FIG. 1 or 9, the electric control unit Ec is connected to a throttle actuator Ath for opening/closing the throttle valve 51 by a signal line (electric wire). The throttle actuator Ath serves to mechanically open/close the throttle valve 51. While the throttle actuator Ath is placed in the vicinity of the throttle valve 51 of the engine E in this embodiment, it may be placed in other places such as the deck, in the vicinity of the throttle lever Lt. While various components including solenoid, servo motor, etc, could possibly be employed as the throttle actuator Ath, it is desirable to select a component capable of being easily controlled by the electric control unit Ec.

In the personal watercraft according to the embodiment of the present invention so constituted, when the rider operates the cruising control switch SWc in the state in which the throttle is in a slightly open position, switching to the cruising control mode according to the rider's operation takes place, thereby maintaining a predetermined engine speed. Hereinafter, functions of the cruising control mode and the control process according to a control program stored in a memory built in the electric control unit Ec, will be described with reference to flowchart of FIG. 2.

When the rider operates the cruising control switch SWc, for example, presses the main switch SWm to be turned ON while the personal watercraft is cruising, the electric control unit Ec detects this ON operation (Step 1 (S1)).

The engine speed sensor Se detects the engine speed at that point (Step 2(S2)), and the electric control unit Ec causes the detected engine speed to be temporarily stored in the memory M (Step 3(S3)). In FIG. 1, the memory M is configured as an external memory connected to the electric control unit Ec, but instead, the above-mentioned built-in memory may be used.

The engine speed sensor Se detects the engine speed again (Step 4 (S4)). The electric control unit Ec compares the detected engine speed with the engine speed stored in the memory M and outputs a command for causing the detected engine speed to coincide with the stored engine speed, to the throttle actuator Ath, thereby regulating the throttle (Step 5 (S5)).

The electric control unit Ec repeats processing in Step 4 and the following Steps until the OFF operation of the cruising control switch SWc is detected, thus performing control so that the engine speed which otherwise would fluctuate due to water resistance or the like on the body is kept constant.

On the other hand, when the OFF operation of the switch SWc is detected, the electric control unit Ec sets back the control process to its initial state (normal drive state) (Step 7(S7)), thus terminating the cruising control mode.

The following conditions for setting back the control process to its initial state (condition for terminating the cruising control) could possibly be used. One or a combination of some of these conditions may be used. The conditions are as follows.

(i) The rider squeezes the throttle lever Lt from its current control position toward an open position. This state is recognized when the current open position of the throttle valve 51 detected by the throttle position sensor Sb and stored in time-series in the memory M, exceeds, by a predetermined amount, a controlled open position output from the electric control unit Ec, i.e., an open position operated by the throttle actuator Ath.

(ii) The rider steers the handle 10 to the right or to the left by a predetermined angle or greater. This state is recognized when the permanent magnet 40 comes close to the corresponding switch 41, which is thereby turned ON, and the steering position sensor Sp detects the ON signal. It should be appreciated that any other means for detecting such handle operation, including a potentiometer, a rotary encoder, a limit switch, etc, may be employed.

(iii) The rider re-presses the main switch SWm. The main switch SWm may be replaced by another switch exclusively for the OFF operation.

By the above-identified cruising control, the rider can set the cruising speed according to a desired engine speed. It should be appreciated that, when the watercraft is cruising in low-speed areas relatively frequently, the cruising seed may be pre-stored in the memory M and automatically set to the pre-stored speed according to the ON operation of the main switch SWm. A plurality of values (e.g., low speed corresponding to approximately 8 km/h, and medium speed in a water tour) may be pre-stored in the memory M. Also, in this embodiment, the resume switch SWr may be used for the rider to suitably select the set value. Such control may be utilized as so-called resume in the cruising control, and will be described with reference to the flowchart of FIG. 3.

When the rider operates the cruising control switch SWc, for example, presses the resume switch SWr to be turned ON while the personal watercraft is cruising, the electric control unit Ec detects this ON operation (Step 1*a* (S1*a*)).

Then, the electric control unit Ec reads in the engine speed pre-stored in the memory M (Step 2*a*(S2*a*)). The engine speed pre-stored in the memory M may be the speed corresponding to approximately 8 km/h in cruising speed, or otherwise the medium speed in the water tour, which may be stored by a manufacture or suitably set by a user.

The engine speed sensor Se detects the engine speed at that point (Step 3*a* (S3*a*)). The electric control unit Ec compares the detected engine speed with the engine speed pre-stored in the memory M and outputs a command for causing the detected engine speed to coincide with the stored engine speed, to the throttle actuator Ath, thereby regulating the throttle (Step 4*a* (S4*a*)).

The electric control unit Ec repeats processing in Step 3*a* and the following Steps until the OFF operation of the main switch SWm is detected, thus performing control so that the engine speed which would fluctuate due to water resistance or the like on the body is kept constant.

On the other hand, when the OFF operation is detected, the electric control unit Ec sets back the control process to its initial state (normal drive state) (Step 6(S6*a*)), thus terminating the cruising control mode.

While the cruising control based on the engine speed has been so far described, the engine speed may be replaced by a cruising speed measured directly by a meter or calculated from the engine speed, and based on this cruising speed, the similar control may be executed.

Further, instead of directly controlling the throttle valve 51 for the purpose of regulating the engine power (engine speed), a sub-fuel supply device may be added to the engine E, for regulating a fuel supply amount.

While the throttle lever Lt is mechanically connected to the throttle valve 51 by means of the push-pull wire 35 or the like in this embodiment, they may be electrically connected by providing a sensor for detecting a rotation amount of the throttle lever Lt so that the electric control unit Ec causes the throttle actuator Ath to operate, in accordance with a detection signal from the sensor. The cruising control of the present invention is easy to execute particularly in the personal watercraft using the electric connection.

Furthermore, the above-mentioned control may be executed by using a direct injection type engine instead of the engine E of a carburetor type illustrated in the embodiments. Since personal watercraft using the direct injection type engine originally includes the electric control unit Ec and a mechanism capable of regulating an ignition timing, a fuel injection amount, or the like, under control of the electric control unit Ec, the above control of the present invention is facilitated.

Moreover, a so-called "steering assist mode control" may be employed, in which when the rider steers the handle by a predetermined amount or more while the throttle is operated by a predetermined amount or less, the engine speed is increased to maintain a steering capability. In that case, both of the cruising control and the steering assist mode control are not executed simultaneously. This avoids control complexity and facilitates mounting.

Embodiment 2

Hereinafter, another carburetor suitable for the cruising control as the fuel supply device will be described.

Figure 10:
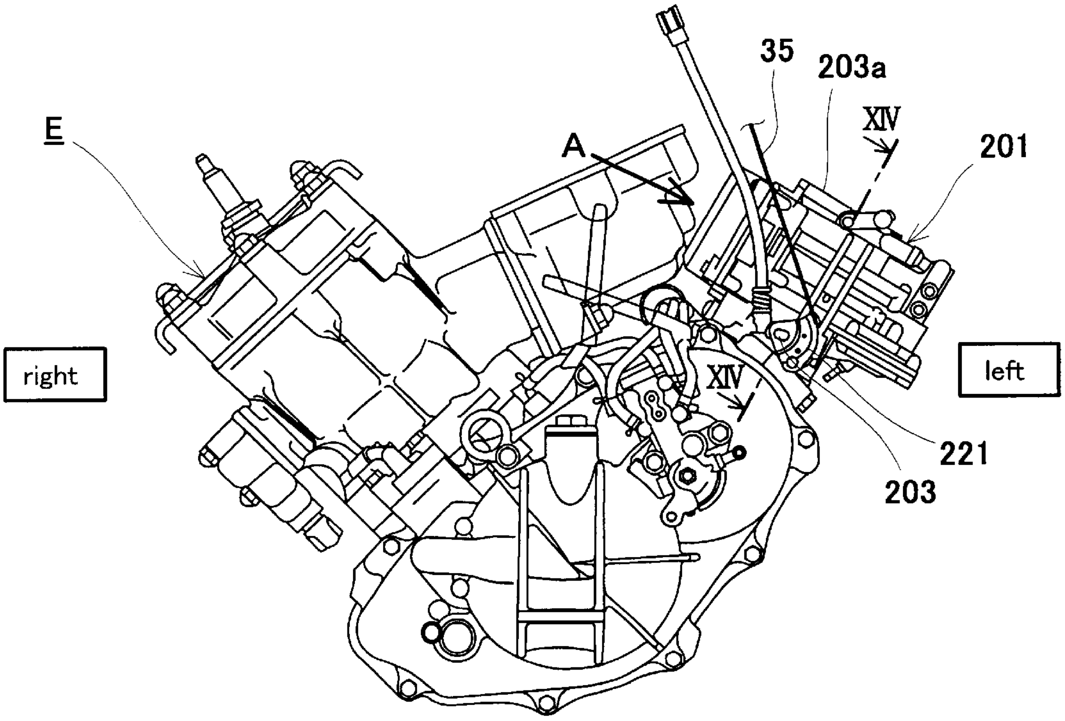
FIG. 10 is a front view showing an engine having a carburetor according to the embodiment of the present invention.
Figure 11:
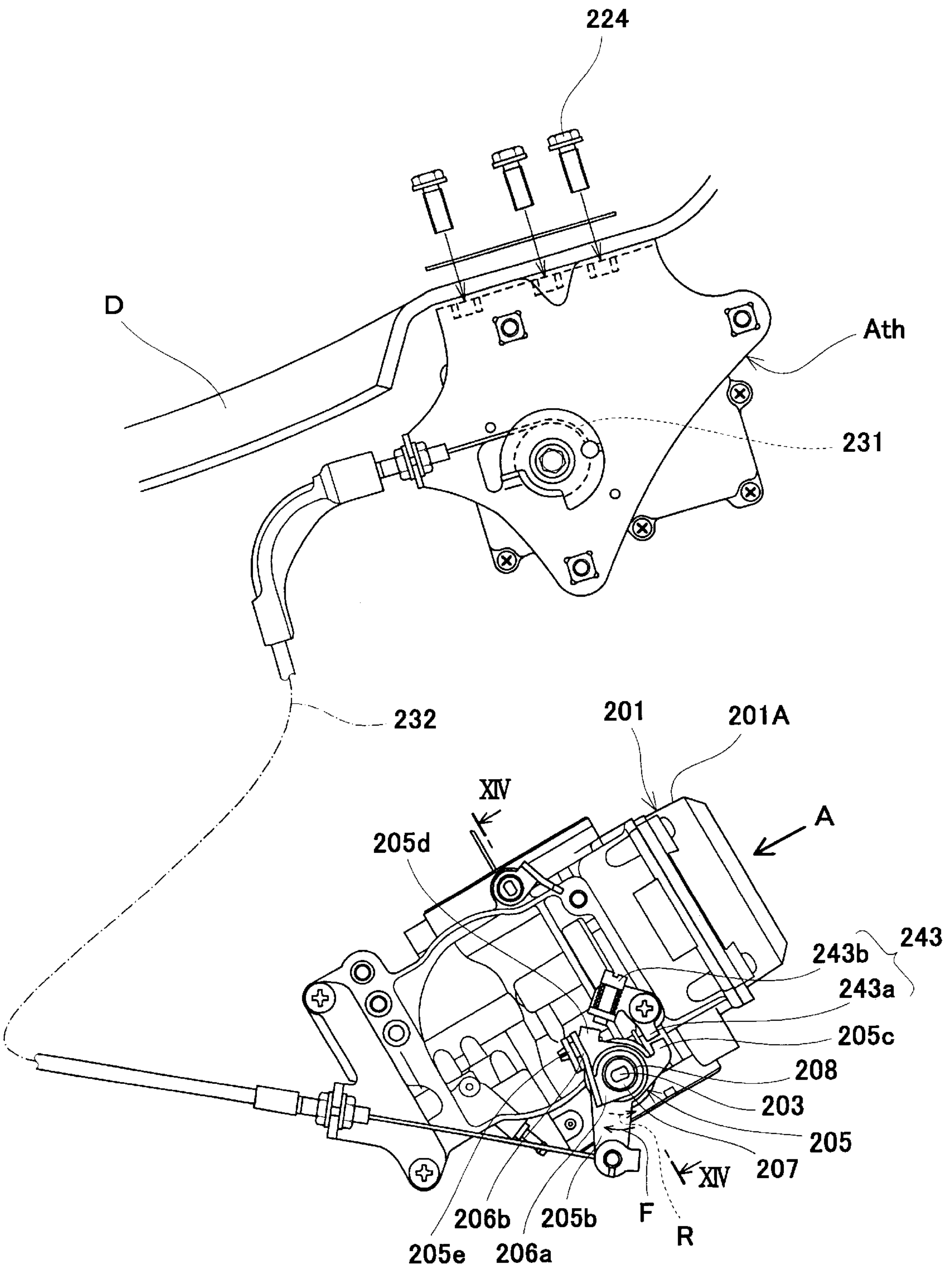
FIG. 11 is a view showing a carburetor and a throttle actuator connected to the carburetor.
Figure 12:
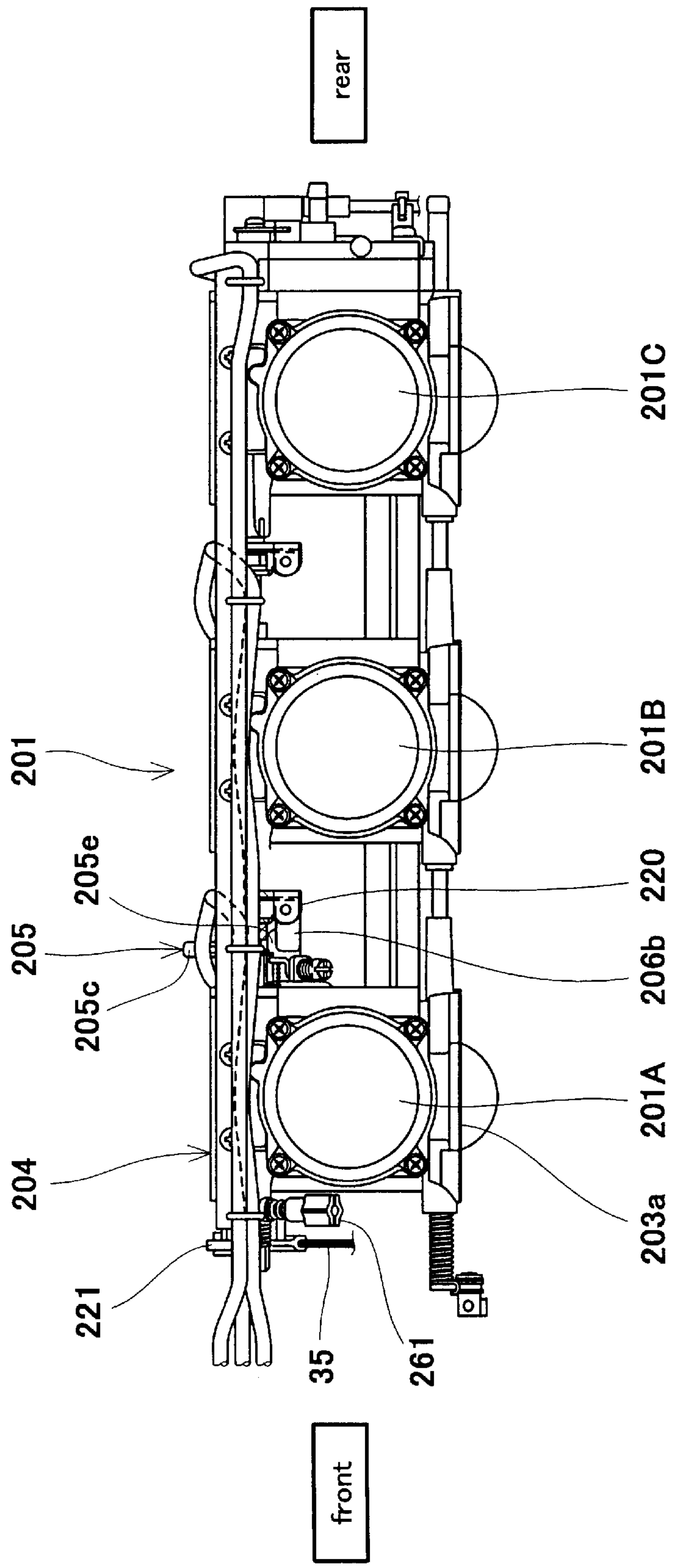
FIG. 12 is a view taken in the direction of arrow A in FIG. 11.
Figure 13:
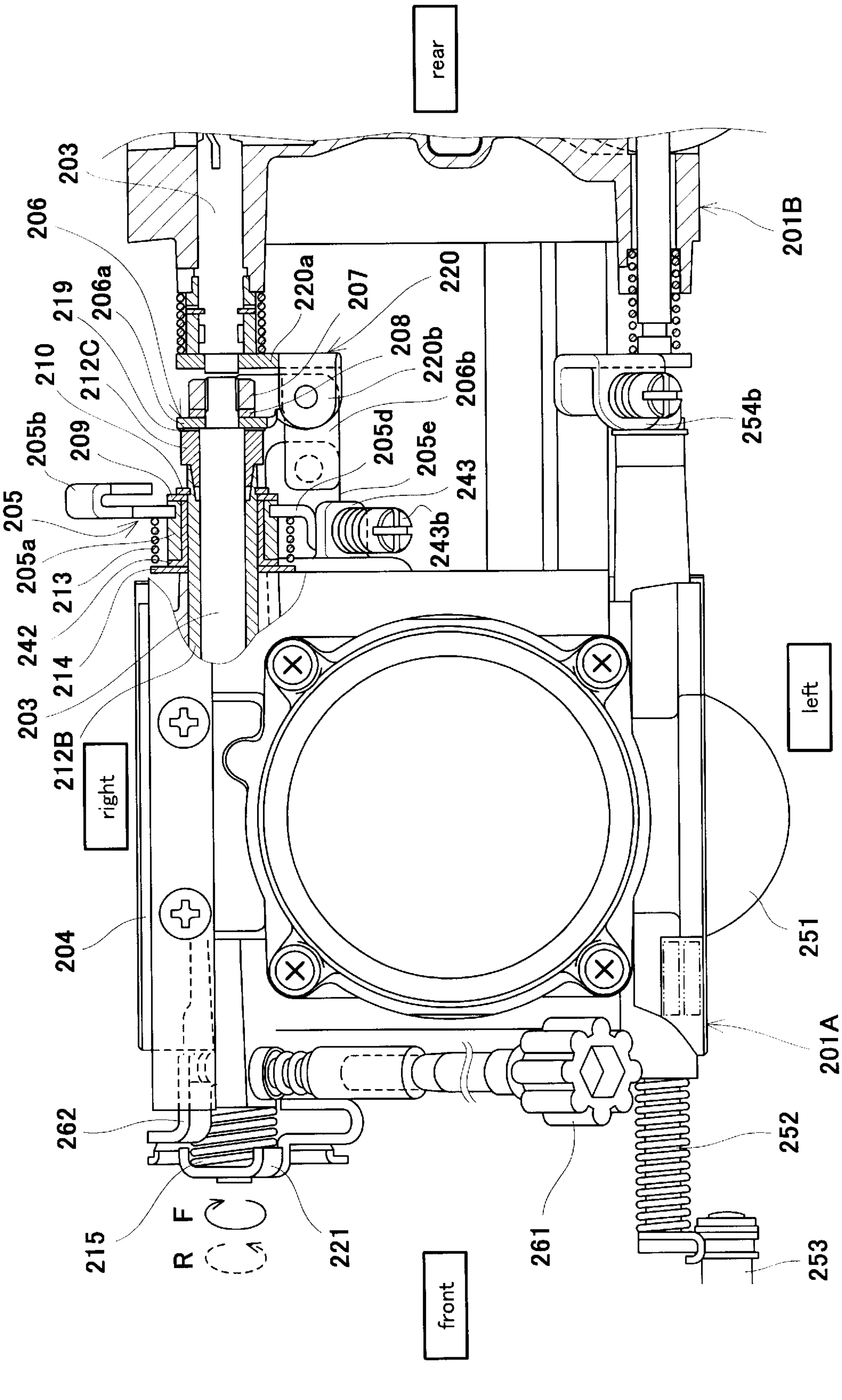
FIG. 13 is a partially enlarged view of FIG. 12, showing a partial cross-section and a plane appearance of a first carburetor.
Figure 14:
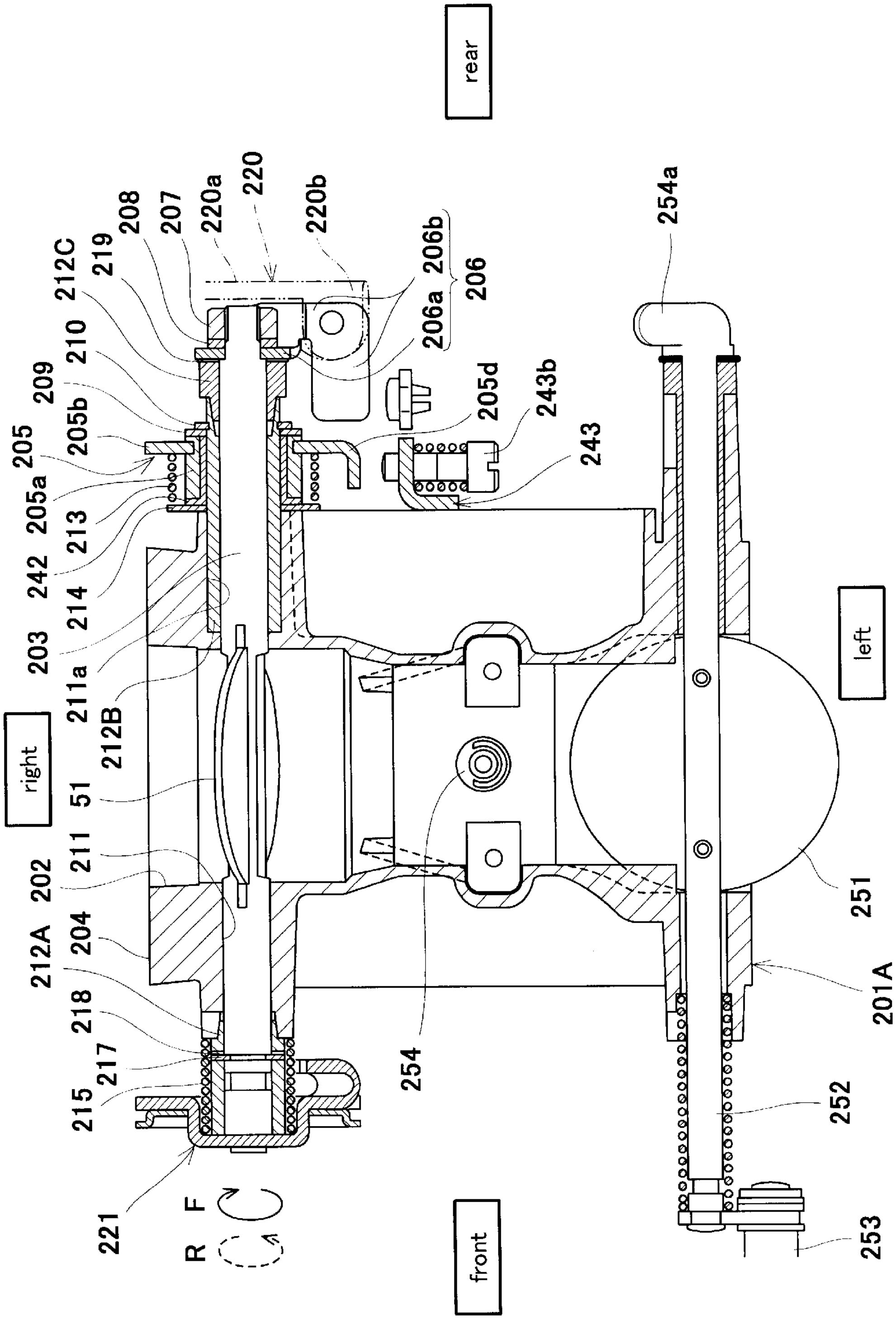
FIG. 14 is a cross-sectional view taken in the direction of arrows substantially along line XIV—XIV in FIGS. 10, 11.

FIG. 10 is a front view showing the engine having the carburetor according to the embodiment. FIG. 11 is a view showing the carburetor and the throttle valve actuator connected to the carburetor. FIG. 12 is a plan view of the carburetor, taken in the direction of arrow A in FIG. 11. FIG. 13 is a partially enlarged cross-sectional view of FIG. 12, showing a partial cross section and a plane appearance of a first carburetor. FIG. 14 is a cross-sectional view taken in the direction of arrows substantially along line XIV—XIV in FIGS. 10, 11. The directions in FIGS. 10, 12, 14 represent the direction of the personal watercraft.

Referring to FIGS. 10, 12, the engine E of the second embodiment is a two-cycle engine having three cylinders. Triple carburetor 201 comprised of first to third carburetors 201A–201C is connected to the engine E. The first to third carburetors 201A–201C are respectively connected to the corresponding cylinders of the engine E (not shown). Intake pipes (not shown) from an air cleaner are connected to inlets 203*a* of air passages of the first to third carburetors 201A–201C. The throttle position sensor Sb (see FIG. 1) is provided at a proper position of the carburetor 201, although this will not be further described herein.

The first to third carburetors 201A–201C have double-throttle structures, which are similar except a rotation transmission mechanism of the throttle valve stem. First of all, a structure of the first carburetor 201A will be described.

FIG. 11 shows a rear appearance of the first carburetor 201A and a side appearance of the throttle actuator Ath. As mentioned later, the throttle valve stems of the second and third carburetors 201B, 201C are connected to a throttle valve stem 203 of the first carburetor 201A. The throttle valve stem 203 of the first carburetor 201A is connected to a pulley 231 of the throttle actuator Ath through a throttle arm (rotary engagement member) 205 and wire (to be precise, inner wire) 232. The throttle actuator Ath is controlled by the electric control unit Ec in FIG. 1. In the embodiment, the throttle actuator Ath is comprised of a servo motor and mounted to the deck D by means of a bolt 224. By mounting the throttle actuator Ath to the deck D, the throttle actuator Ath is hardly affected by the oscillation of the engine E.

Referring to FIGS. 13, 14, in the first carburetor 201A, an air passage 202 is formed so as to penetrate through a body 204 of the first carburetor 201A substantially in the right-and-left direction and a stem hole 211 is formed so as to extend along the direction orthogonal to the air passage 202 and penetrate through the body 204 in the front-and-rear direction. Reference numeral 254 denotes a fuel injection nozzle. An auxiliary throttle valve stem 252 is provided in the air passage 202 and will be described later.

One end portion (front end portion) of the stem hole 211 is of an inverted-taper shape. A first cylindrical bearing member 212A with steps is provided at the one end portion. The other end portion (rear end portion) of the stem hole 211 has a large-diameter portion 211*a* and a second cylindrical bearing member 212B is provided in the large-diameter portion 211*a*. Outer end portion (rear end portion) of the second bearing member 212B is of an inverted-taper shape. A third cylindrical bearing member 212C is provided at the outer end portion of the second bearing 212B. The throttle valve stem 203 is inserted into the stem hole 211 and made rotatable by means of the first to third bearing members 212A–212C. A throttle valve 51 is fixed to the throttle valve stem 203 in the air passage 202. In this embodiment, the carburetor has two throttle valves. The throttle valve 51 corresponds to the throttle valve shown in FIG. 9 and function in a similar way. A throttle pulley 221 in a sector form (see FIG. 10) as seen in a front view is provided at one end (front end) of the throttle valve stem 203. The inner wire of the wire 35 is secured to the throttle pulley 221 such that it is wound around the throttle pulley 221 (see FIGS. 10, 12). As shown in FIG. 8, the wire 35 is connected to the throttle lever Lt of the handle 10. As shown in FIGS. 13, 14, a cylindrical spacer 216 is outerly fitted to the throttle valve stem 203 so as to be in contact with an inner side face of the throttle pulley 221 and fixed to the throttle valve stem 203 by means of a snap ring 217. A washer 218 is provided between the snap ring 217 and an end face of the first bearing member 212A. A coil spring 215 is provided on outer side of the spacer 216, the snap ring 217, the washer 218, and the first bearing member 212A. The coil spring 215 is fixed at one end to the throttle pulley 221 and at the other end to the body 204 to allow the throttle valve stem 203 to be biased clockwise R as seen in a front view (hereinafter referred to as a reverse rotational direction R). As shown in FIG. 13, a contact portion 262 is provided at the throttle pulley 221 so that the contact portion 262 contacts the tip end of an idling regulation screw 261 provided on the body 204 of the carburetor in the reverse rotational direction R. As defined herein, the reference position of the throttle valve stem 203 in the forward rotational direction F is the position at which the contact portion 262 contacts the tip end of the idling regulation screw 261. Therefore, the reference position is adjustable by rotating the idling regulation screw 261 to be advanced/retracted. Normally, the idling regulation screw 261 is regulated so that the throttle valve 51 becomes at an open position for enabling the air passage 202 to be slightly opened in the state in which the throttle valve stem 203 is at the reference position where rotational angle in the forward rotational direction F is equal to zero. Herein below, "the throttle valve opens/closes the air passage" is simply expressed as "throttle valve is opened/closed." In the above constitution, when the inner wire of the wire 35 is pulled against the bias by the coil spring 215, the throttle valve stem 203 rotates in the forward rotational direction F (rotational direction opposite to the reverse rotational direction), thereby increasing the opening of the throttle valve 51. In this state, when the inner wire of the wire 35 is released, the throttle valve stem 203 rotates in the reverse rotational direction R by the bias by the coil spring 215, thus reducing the opening of the throttle valve 51.

A connecting member 206 is connected to the other end (rear end) of the throttle valve stem 203 by means of a nut 207 and the washer 208. A washer 219 is provided between the connecting member 206 and an end face of the third bearing member 212C. The connecting member 206 has a circular-plate shaped fixed portion 206*a* and a plate-shaped connecting portion 206*b* extending forwardly from the outer periphery of the fixed portion 206*a*. The fixed portion 206*a* is fixed to the throttle valve stem 203.

A spring mounting member 214 of a hollow circular plate shape is outerly fitted to the outer periphery of the portion of the second bearing member 212B which protrudes from the body 204 of the carburetor and a cylindrical sleeve 242 with flange is outerly fitted to the outer periphery such that the flange is in contact with the spring mounting member 214. The throttle arm 205 is rotatably outerly fitted to a body of the sleeve 242, and the spring mounting member 214 and the sleeve 242 are mounted on the second bearing member 212B through the washer 209 by means of the snap ring 210. A coil spring 213 is interposed between the throttle arm 205 and the spring mounting member 214, for biasing the throttle arm 205 toward the reverse rotational direction R.

Referring to FIGS. 11, 13, 14, the throttle arm 205 is comprised of a cylindrical body portion 205*a*, and an arm portion 205*b*, a first contact portion 205*c*, and a second contact portion 205*d* respectively extending substantially radially from the body portion 205*a*, and an engagement portion 205*e* extending rearwardly from the outer periphery of the body portion 205*a*. The throttle arm 205 is configured such that the body portion 205*a* is rotatably fitted to the sleeve 242 and the arm portion 205*b* is connected to a wire 232. When the wire 232 is advanced/retracted, the throttle arm 205 correspondingly rotates. The first contact portion 205*c* is provided so as to contact a contact portion 243*a* of a stopper 243 provided in the body 204 in the reverse rotational direction R at a reference position of the throttle arm 205. When the throttle arm 205 rotates through a predetermined angle in the forward rotational direction F from the reference position, the second contact portion 205*d* is brought into contact with the tip end of an output upper regulation screw 243*b* provided in the stopper 243. Therefore, the throttle arm 205 is rotatable through the predetermined angle, and the predetermined angle through which the throttle arm 205 is rotatable is regulated by rotating the output upper regulation screw 243*b* to be advanced/retracted. The engagement portion 205*e* is positioned behind the tip end of a connecting portion 206*b* of the connecting member 206 fixed to the throttle valve stem 203. Therefore, when the throttle arm 205 rotates in the forward rotational direction F, the engagement portion 205*e* is brought into contact with the tip end of the connecting portion 206*b* of the connecting member 206, thereby causing the throttle valve stem 203 to rotate in the forward rotational direction F. However, when the throttle valve stem 203 rotates in the forward rotational direction F, the throttle arm 205 is stationary because the connecting portion 206*b* moves away from the engagement portion 205*e*.

Subsequently, a connecting structure between the first and second carburetors 201A, 201B, and a connecting structure between the second and third carburetors 201B, 201C will be described.

Referring to FIGS. 13, 14, a front connecting member 220 is provided at a front end of the throttle valve stem 203 of the second carburetor 201B. The front connecting member 220 is comprised of an arm portion 220*a* fixed to the throttle valve stem 203 and a retaining portion 220*b* with U-shaped cross section that is formed at the tip end of the arm portion 220*a*. The retaining portion 220*b* serves to retain a base end portion of the connecting portion 206*b* of the connecting member 206 of the first carburetor 201A, thereby transmitting the rotation of the throttle valve stem 203 of the first carburetor 201A to the throttle valve stem 203 of the second carburetor 201B. A rear connecting member (not shown) is provided at a rear end of the throttle valve stem 203 of the second carburetor 201B similarly to the connecting member 206 of the first carburetor 201A. The front connecting member (not shown) identical to the front connecting member 220 of the second carburetor 201B is provided at the front end of the throttle valve stem of the third carburetor 201C, thereby transmitting the rotation of the throttle valve stem of the second carburetor 201B to the throttle valve stem of the third carburetor 201C.

As shown in FIGS. 13, 14, the auxiliary throttle valve stem 252 is rotatably mounted at a portion of the air passage 202 of the first carburetor 201A that is located upstream of the fuel injection nozzle 254 so as to penetrate through the air passage 202 in the front-and-rear direction. The auxiliary throttle valve stem 252 is provided with an auxiliary throttle valve 251 in the air passage 202. The second and third carburetors 201B, 201C are configured in the same manner. Specifically, the valve stem 252 of the first carburetor 201A is connected by means of connecting means 254*a*, 254*b* to the valve stem 252 of the second carburetor 201B, which is in turn connected by means of connecting means 254*a*, 254*b* to the valve stem 203 of the carburetor 201C. The front end of the auxiliary throttle valve stem 252 of the first carburetor 201A is connected to a movable element 253 of the auxiliary throttle actuator (not shown). Here, the auxiliary throttle actuator is comprised of a servo motor, which is connected to the electric control unit Ec in FIG. 1. The electric control unit Ec is adapted to control the auxiliary throttle actuator according to a signal from the throttle position sensor Sb (see FIG. 1) so that the auxiliary throttle valve 251 is opened/closed more slowly than the throttle valve 51 at a timing delayed with respect to the timing at which the throttle valve 51 is opened/closed.

Subsequently, the operation of the carburetor 201 so constituted will be described with reference to FIGS. 1, 8, and 10 through 14.

Here, it is assumed that, the cruising control is now in the OFF-state and the engine E is running. Upon releasing the throttle lever Lt, in the first carburetor 201A, the throttle valve stem 203 rotates to the reference position in the reverse rotational direction R by the bias by the coil spring 215, thereby slightly opening the throttle valve 51. The throttle arm 205 is also at the reference position by the bias by the coil spring 213. Then, under control of the electric control unit Ec, the auxiliary throttle valve 251 is moved to the same open position as the throttle valve 51 at the timing delayed with respect to the timing at which the throttle valve 51 is moved. Thereby, the engine E enters the idling state.

In this state, when the rider squeezes the throttle lever Lt, the inner wire of the wire 35 is pulled, thereby causing the throttle valve stem 203 to rotate in the forward rotational direction F, which increases the opening of the throttle valve 51. Meanwhile, the throttle arm 205 is stationary and remain at the reference position. The auxiliary throttle valve 251 operates more slowly than the throttle valve 51 at the timing delayed with respect to the timing at which the throttle valve 51 operates, under control of the electric control unit Ec. This increases a torque of the engine E, but suppresses a rapid change in the torque.

When the rider presses the main switch SWm of the cruising control switch SWc to be turned ON, in the state in which the throttle lever Lt is in a released state, the electric control unit Ec performs feed back control of the engine power so that the engine E is running at a predetermined engine speed. Specifically, when the engine speed detected by the engine speed sensor Se is lower than the predetermined engine speed, the electric control unit Ec outputs a control signal for increasing the engine power to the throttle actuator Ath, which responsively pulls the wire 232 in accordance with the control signal. Thereby, the throttle arm 205 rotates in the forward rotational direction F, which brings the engagement portion 205*e* into contact with the connecting portion 206*b* of the connecting member 206 of the throttle valve stem 203. Thereby, the throttle valve stem 203 rotates in the forward rotational direction F along with the throttle arm 205. This increases the opening of the throttle valve 51 and opening of the auxiliary throttle valve 251. As a result, the engine power and the engine speed are increased. The electric control unit Ec continues to output the above-identified control signal to the throttle actuator Ath until the engine speed detected by the engine speed sensor Se reaches a predetermined value.

After the engine speed has reached the predetermined value, when the engine speed is further increased due to, for example, reduced resistance of the body, or the like, the electric control unit Ec outputs a control signal for reducing the engine power to the throttle actuator Ath, for performing feedback control so that the engine E runs at the predetermined engine speed. During the control, the throttle actuator Ath pushes the wire 232 in accordance with the control signal. Thereby, the throttle arm 205 rotates in the reverse rotational direction R to cause the engagement portion 205*e* to be retracted. Correspondingly, the throttle valve stem 203 rotates in the reverse rotational direction R by the bias by the coil spring 215 in the state in which the connecting portion 206*b* is in contact with the engagement portion 205*e*. This reduces the opening of the throttle valve 51 and the opening of the auxiliary throttle valve 251. As a result, the engine power and the engine speed are reduced.

As should be appreciated from the foregoing, the use of the carburetor of the embodiment can execute the cruising control in a suitable manner. Besides, since the wire 35 from the throttle laver Lt and the wire 232 from the throttle actuator Ath are respectively connected to the different end portions of the throttle valve stem 203, the carburetor 201 can be installed without great spatial limitation.

In the case of engines other than the three-cylinder engine, carburetors equal in number to the corresponding cylinders may be connected.

While the personal watercraft having the engine with carburetors has been described in the preferred embodiment, the present invention is applicable to a personal watercraft having a fuel injection type engine.

Moreover, in the constitution of FIG. 1, the input from the cruising control switch SWc may be replaced by the input from the steering position sensor Sp so that the throttle actuator Ath is controlled by the electric control unit Ec to cause the throttle valves 51, 251 to move to predetermined open positions, when the handle is steered by a certain amount or more while the throttle lever Lt is operated by a predetermined amount or less. This increases the engine speed, and thereby maintains the steering capability. In this manner, a so-called "steering assist mode control" can be executed.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A jet-propulsion personal watercraft comprising:

a water-jet pump including an outlet port and a steering nozzle, the water jet pump pressurizing and accelerating sucked water and ejecting the water from the outlet port to propel the watercraft as a reaction of the rejecting water;

a cruising control operation means;

a fuel supply unit for supplying fuel to an engine for driving the water jet pump;

a throttle operation means for opening/closing a throttle of the fuel supply unit for regulating a supply amount of the fuel;

an actuator for opening/closing the throttle of the fuel supply unit; and a control means for controlling the actuator so that the watercraft cruises at a predetermined cruising speed or a predetermined engine speed, in accordance with an operation of the cruising control operation means, wherein the fuel supply unit is a carburetor comprising a throttle valve fixed to a rotational shaft and rotating with the rotational shaft to cause an air flow passage of the carburetor to be opened/closed, a connecting member provided at one end of the rotational shaft so as to rotate with the rotational shaft, a rotary engagement member being rotatable coaxially with the rotational shaft, and a throttle pulley provided at the other end of the rotational shaft so as to rotate with the rotational shaft, the rotary engagement member can be brought into contact with an engagement portion of the connecting member by rotating relatively to the engagement portion in a rotational direction of the rotational shaft to cause the throttle valve to be opened, the throttle pulley is rotated by the throttle operation means, and the rotary engagement member is rotated by the actuator.

2. The jet propulsion personal watercraft according to claim 1, wherein the actuator is mounted on an inner surface of the deck to be spaced apart from the engine.

3. The jet propulsion personal watercraft according to claim 1, wherein the cruising control operation means is attached on the steering handle in the vicinity of the grip on the side where the throttle operation means is provided.

* * * * *